April 21, 1970 H. H. WOLFF 3,507,990
LONG RANGE TARGET
Filed Feb. 1, 1967
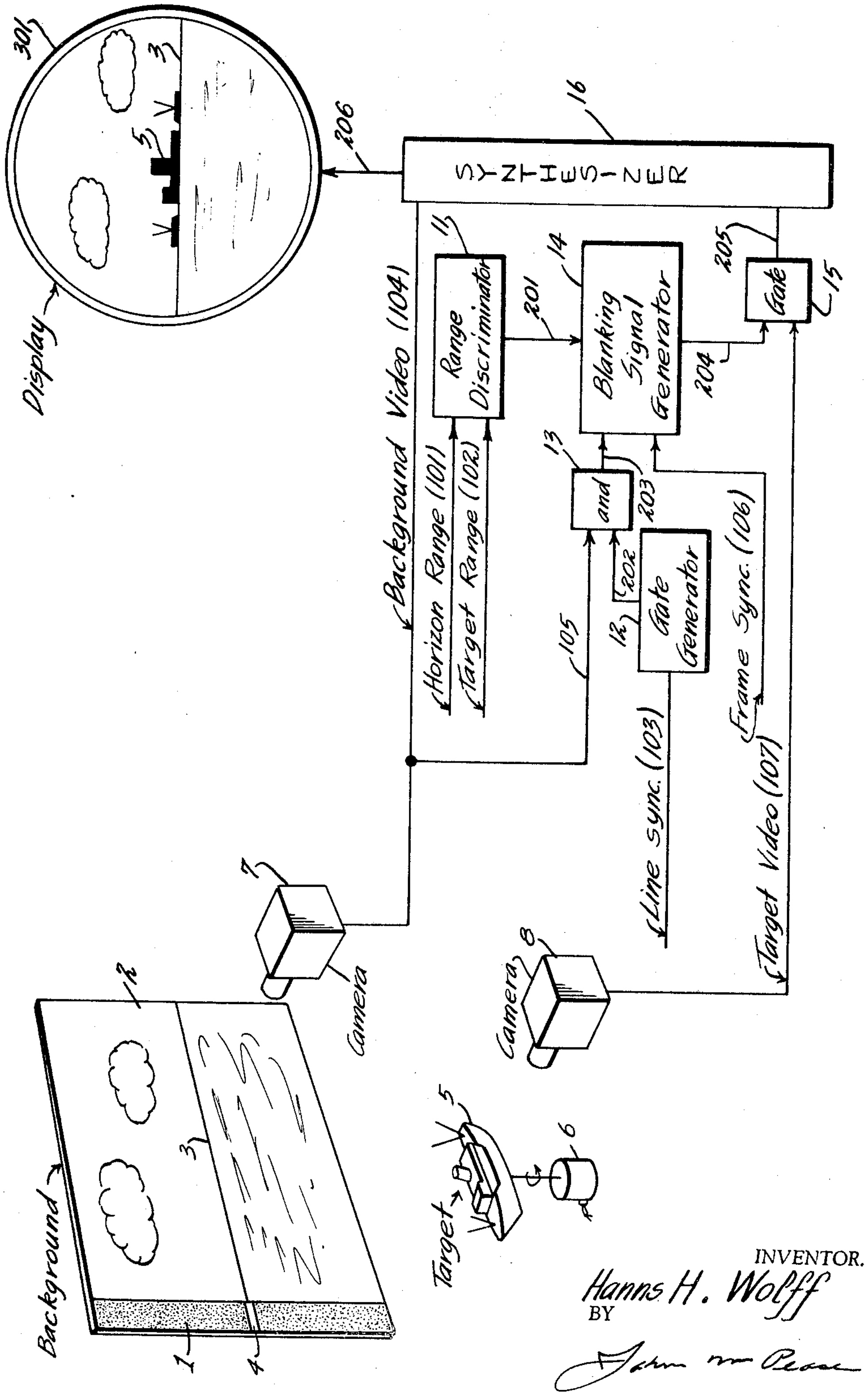
INVENTOR.
Hanns H. Wolff
BY
John M. Pease

United States Patent Office 3,507,990
Patented Apr. 21, 1970

3,507,990

LONG RANGE TARGET

Hanns H. Wolff, Orlando, Fla., assignor to the United States of America as represented by the Secretary of the Navy Continuation-in-part of application Ser. No. 580,835, Sept. 20, 1966, which is a continuation-in-part of application Ser. No. 535,659, Mar. 14, 1966. This application Feb. 1, 1967, Ser. No. 613,980
Int. Cl. H04n 7/06
U.S. Cl. 178—6.8 4 Claims

ABSTRACT OF THE DISCLOSURE

In an electronic synthesizer for synthesizing two or more scanning independent images, means indicating the horizon which control the blanking of those image parts that are hidden behind the horizon.

Cross references to related applications

This application is a continuation-in-part of application Ser. No. 580,835, filed Sept. 20, 1966, now Patent No. 3,420,953 which is a continuation-in-part of application No. 535,659, filed Mar. 14, 1966.

Background of the invention

In picture synthesizer systems as they have been described in my co-pending applications (Ser. Nos. 535,659 and 580,835) to simulate the environment for example in form of periscope observation it is often desirable to place a target, especially a surface target, at such an apparent range that it would be partially (or totally) hidden behind the horizon. This invention concerns this problem and solves it by generating a blanking signal that prevents that part of a target which should be hidden behind the horizon from entering the synthesizing system as described in the above referenced previous patent applications.

Summary of the invention

The invention is an improved apparatus for wholly or partially blanking the image of an object, e.g. a target which is wholly or partially beyond the horizon in a television display. One application might be in an electronic synthesizer system such as disclosed in the above mentioned applications. In the disclosed embodiment a background scene such as a transparency or picture which is scanned by a camera has a horizon identifying signal strip located on one edge of the transparency or picture. This strip is encountered first by the camera scanning beam when scanning the background scene. A horizon marker of different appearance from the signal strip is placed on the signal strip at a level determined by the range of the horizon. When the camera scanning beam encounters the marker a horizon identifying signal appears in the camera video information output shortly after the beginning of the line scan of the horizon. This horizon identifying signal is combined with range information by the apparatus of the invention to blank out the video information from a second television camera which is scanning a target. This removes the image or any part of the image of a target which is located beyond and under the horizon from a combined background-target display. Means are provided to continue the blanking to the end of the particular frame (field).

Brief description of the drawing

The drawing shows a composite view of a picture of a background scene with a horizon identifying signal strip attached thereto and positioned for scanning by a camera which is connected to a blanking circuit and to synthesizer and display apparatus. A second camera scans a target and feeds video information through the blanking circuit to the synthesizer where it is combined with that from the first camera.

Description of the preferred embodiment

The figure shows a seascape background scene which may be a picture 2, a transparency, or a three dimensional model. Picture 2 is positioned to be scanned by a television camera 7. The video information output of camera 7 is connected by a line 104 to a synthesizer circuit 16 which is of the type disclosed in the above noted co-pending applications.

A model ship "target" 5 which may be rotated by servo drive 6 to any desired position is scanned by a television camera 8, the video information output of which is connected by line 107 through gate 15 and line 205 to synthesizer 16. There the video information from camera 8 is combined with that from camera 7 and forwarded through line 206 to television display 301 which is arranged to simulate, for example, the observation station of a periscope. The combined video information produces a composite view on display 301 showing target 5 in the seascape of picture 2.

Associated with the background scenery is a horizon identifying signal strip 1 which may be a strip of dark material and which is scanned by the same scanning system as the background scenery 2. The scanning of the horizon 3 is identified by a marker 4 of light or bright material which contrasts with the horizon identifying signal strip 1 and which therefore appears in the background video signal shortly after the beginning of the line scan. It appears during the picture scanning only when the line scan is about to begin to scan the horizon.

The figure also shows a possible form of embodiment of a circuit that produces a blanking signal needed to prevent the target video signal from entering the synthesizer during the scanning of that part of the target that should disappear behind the horizon. The horizon range voltage (being a measure for the range under which the horizon is seen from the observation point) is fed over a line 101 to the range discriminator 11. The target range identifying voltage is fed over the line 102 to the same range discriminator 11. The range discriminator 11 releases an enabling signal via line 201 if, and only if the target range is larger than the horizon range. The line sync pulses are fed over line 103 to a gate generator 12. This gate generator produces a signal that lasts from the beginning or shortly after the beginning of the scan of the horizon identifying signal strip 1 to shortly before the scanning beam leaves this horizon identifying signal strip. This gating signal is fed via line 202 to an "AND" gate 13. The background video signal is also fed via line 104 and 105 into the "AND" gate 13. The "AND" gate 13 releases therefore via line 203 a pulse signal which exists only during the scanning of the identifying marker 4.

A blanking signal generator 14 is provided which receives the enabling signal received from range discriminator 11 via line 201 and ables the generating of a blanking signal only if and when the enabling signal is present. The pulse released from the "AND" gate 13 is fed via line 203 to the blanking signal generator and initiates a blanking providing the enabling signal is present which will last until it is stopped by the next frame (field sync pulse) which is fed via line 106 to the blanking signal generator 14. The blanking signal generator releases therefore a blanking signal via line 204 which lasts from the beginning of the horizon scan to the end of the frame (field scan). It is fed to a gate 15 which is controlling the target video coming in over line 107. If no blanking signal is present the target video can pass the gate via line 205 into the synthesizer 16 whereas while a blanking signal exists on line 204 the target video is prevented from entering the synthesizer 16. The background video is also fed via line 104 to the synthesizer 16.

Such a blanking signal system has of course to be provided for each target for which partial (or total) obstruction by the horizon is desired. In the described example target 5 is partially obstructed by horizon 3 in display 301.

The system described above supposes a scanning proceeding from top to bottom. If a reverse scanning operation is used the blanking signal generator 14 and/or the gate 15 have to be such that the gate is open from the time the horizon identifying pulse is released and the time the next frame (field) pulse occurs.

The systems described above can also be used to present celestial bodies, satellites and other spacecraft, disappearing or rising behind the horizon.

Many changes and modifications of the invention will become obvious from the above disclosure. It is therefore to be understood that within the scope of the appended claims the invention may be practiced in numerous ways not specifically described herein.

What is claimed is:

1. In an electronic synthesizer simulator system, wherein a plurality of television cameras scan respective target means and a background to supply video information to an electronic synthesizer, which synthesizes a composite picture of said target means and said background on a television display the improvement comprising:

means for presenting a background scene including a horizon for scanning by a first television camera means, horizon identifying means attached thereto causing said camera means to generate a horizon identifying signal in the camera video output immediately before the line scan of the horizon in said background scene, target means, second television camera means for scanning said target means to produce target video information, means for generating synchronizing pulses including field sync pulses for synchronizing said system, means connecting said means for generating synchronizing pulses to the elements of said system to synchronize said elements, whereby said first and second camera means are caused to operate in timed relationship and blanking signal generator means for blanking the target video information from the time said horizon identifying signal is generated until the following field sync pulse occurs.

2. The apparatus of claim 1, wherein the horizon identifying means comprise a horizon identifying signal strip and a horizon marker.

3. The apparatus of claim 2, wherein the means for blanking said target video information comprise blanking circuit means and range discriminating means, said range discriminating means enabling said blanking circuit means when the range of said target is greater than the range of said horizon so that blanking circuit means produces a target video information blanking signal when said horizon identifying signal is received.

4. The apparatus of claim 3, wherein said blanking circuit comprises a blanking signal generator, an "AND" gate, a gate generator, and a video gate, said gate generator being connected to forward a gate signal to said "AND" gate when triggered by a line sync pulse, said "AND" gate being connected to forward an actuating signal to said blanking signal generator when enabled by said gate signal and said horizon identifying signal, said blanking signal generator forwarding a blanking signal to said video gate on receipt of signals from said "AND" gate and said range discriminating means.

References Cited

UNITED STATES PATENTS 2,784,246 3/1957 Hurford ............ 178—6

ROBERT L. GRIFFIN, Primary Examiner

B. L. LEIBOWITZ, Assistant Examiner

U.S. Cl. X.R.

35—25; 178—6